(12) United States Patent
Kim et al.

(10) Patent No.: US 9,134,837 B2
(45) Date of Patent: Sep. 15, 2015

(54) DISPLAY APPARATUS WITH REDUCED SIGNAL INTERFERENCE

(75) Inventors: WoongKwon Kim, Cheonan-si (KR); Daecheol Kim, Hwaseong-si (KR); Ki-Hun Jeong, Cheonan-si (KR); DongKwon Kim, Asan-si (KR); HeeJoon Kim, Asan-si (KR); Inhan Jeon, Suwon-si (KR); Ho-young Kim, Cheonan-si (KR); Jung suk Bang, Guri-si (KR)

(73) Assignee: Samsung Display Co., Ltd., Yongin (KR)

( * ) Notice: Subject to any disclaimer, the term of this patent is extended or adjusted under 35 U.S.C. 154(b) by 274 days.

(21) Appl. No.: 13/297,463

(22) Filed: Nov. 16, 2011

(65) Prior Publication Data

US 2012/0268356 A1   Oct. 25, 2012

(51) Int. Cl.
*G09G 3/34* (2006.01)
*G06F 3/041* (2006.01)
*G02F 1/1333* (2006.01)
*G02F 1/1362* (2006.01)
*G06F 3/042* (2006.01)

(52) U.S. Cl.
CPC .......... *G06F 3/0412* (2013.01); *G02F 1/13338* (2013.01); *G02F 1/136286* (2013.01); *G06F 3/042* (2013.01); *G02F 2203/11* (2013.01)

(58) Field of Classification Search
CPC .......... G02F 1/13338; G02F 1/136286; G02F 2203/11
USPC .................................. 345/204, 690
See application file for complete search history.

(56) References Cited

U.S. PATENT DOCUMENTS

| | | | |
|---|---|---|---|
| 2008/0084374 A1* | 4/2008 | Abileah et al. .................. 345/87 |
| 2010/0001965 A1* | 1/2010 | Wang et al. .................... 345/173 |
| 2010/0013794 A1* | 1/2010 | Abileah et al. ................ 345/174 |
| 2010/0039408 A1* | 2/2010 | Cho et al. ...................... 345/175 |
| 2011/0153284 A1* | 6/2011 | Li et al. ............................. 703/1 |
| 2011/0205209 A1* | 8/2011 | Kurokawa et al. ............ 345/211 |
| 2012/0038585 A1* | 2/2012 | Kim .............................. 345/174 |

* cited by examiner

*Primary Examiner* — Dennis Joseph
*Assistant Examiner* — Chun-Nan Lin
(74) *Attorney, Agent, or Firm* — H.C. Park & Associates, PLC (57) ABSTRACT

In a display apparatus, a first substrate includes a plurality of pixels and a plurality of first signal lines connected to the pixels. A second substrate includes a plurality of sensors and a plurality of second signal lines connected to the sensors and extended in a direction in which the first signal lines are extended. Each of the second signal lines is disposed between two first signal lines adjacent to each other and disposed closer to a center line, which divides an area between the two first signal lines into two portions, than the two first signal lines. Thus, signal interference between the first and second signal lines may be reduced, thereby preventing mis-operation or malfunction of the display apparatus.

20 Claims, 10 Drawing Sheets

DISPLAY APPARATUS WITH REDUCED SIGNAL INTERFERENCE

CROSS-REFERENCE TO RELATED APPLICATION

This application claims priority to and the benefit of Korean Patent Application No. 10-2011-0038610 filed on Apr. 25, 2011, which is hereby incorporated herein by reference for all purposes as if fully set forth herein.

BACKGROUND

1. Field of the Invention

Exemplary embodiments of the present invention relate to a display apparatus. More particularly, the present invention relates to a display apparatus capable of preventing mis-operation or malfunction due to signal interference in a display panel in which a sensor is built.

2. Description of the Background

Recently, a display apparatus including a touch panel has been widely adopted since separate input devices, such as a keyboard and a mouse, are no longer required to operate the display apparatus.

A touch panel has been used in a liquid crystal display to detect touch events by a user. However, when the touch panel is provided separately from the display panel, optical properties of the liquid crystal display, such as brightness, visibility and viewing angle, may be deteriorated, consequently the whole thickness of the display is increased by the thickness of the touch panel that may cause a malfunction by signal interference by touch sensors.

Thus, there is a need for an approach to provide a liquid crystal display capable of eliminating signal interferences between the display panel and the touch panel.

SUMMARY

Exemplary embodiments of the present invention provide a display apparatus capable of preventing mis-operation or malfunction due to signal interference in a display panel in which a sensor is built.

Additional features of the invention will be set forth in the description which follows, and in part will be apparent from the description, or may be learned by practice of the invention.

Exemplary embodiments of the present invention disclose a display apparatus. The display apparatus includes a substrate comprising a first substrate and a second substrate. The first substrate includes a plurality of pixels and a plurality of first signal lines connected to the pixels. And the second substrate includes a plurality of sensors and a plurality of second signal lines connected to the sensors and extended in a direction in which the first signal lines are extended. The second substrate is coupled to the first substrate. And each of the second signal lines is disposed between two of the first signal lines being adjacent to each other, and is disposed at a position closer to a center line between the two of the first signal lines than the two of the first signal lines, wherein the two of the first signal lines are divided by the center line.

Exemplary embodiments of the present invention disclose an apparatus. The apparatus includes a first substrate including a plurality of pixels, a plurality of gate lines configured to turn on the pixels in at least one row unit, and a plurality of data lines configured to apply a data signal to the pixels being tuned on. The apparatus comprises a second substrate including a plurality of sensors, a plurality of scan lines configured to turn on the sensors in at least one row unit, and a plurality of readout lines configured to read out a signal detected from the sensors being turned on. And each of the readout lines is disposed between two of the data lines being adjacent to each other, and is disposed at a position closer to a center line between the two of the data lines than the two of the data lines, wherein the two of the data lines are divided by the center line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although numerical terms such as first, second and third may be used herein to describe various elements, components, regions, layers and/or sections, these elements, components, regions, layers and/or sections should not be limited by these terms. These terms are merely used to specify a sequence of an element, a component, a region, a layer or a section from another region, layer or section.

Spatially relative terms, such as "beneath", "below", "lower", "above", "upper" and the like, may be used herein for illustration of elements or spatial relationship with respect to one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative terms used herein may be interpreted accordingly.

The terminology used herein is for the purpose of describing particular embodiments only and is not intended to be limiting of the invention. As used herein, the singular forms, "a", "an" and "the" may include the plural forms as well, unless the context clearly indicates otherwise.

Hereinafter, exemplary embodiments of the present invention will be explained in detail with reference to the accompanying drawings.

Figure 1:
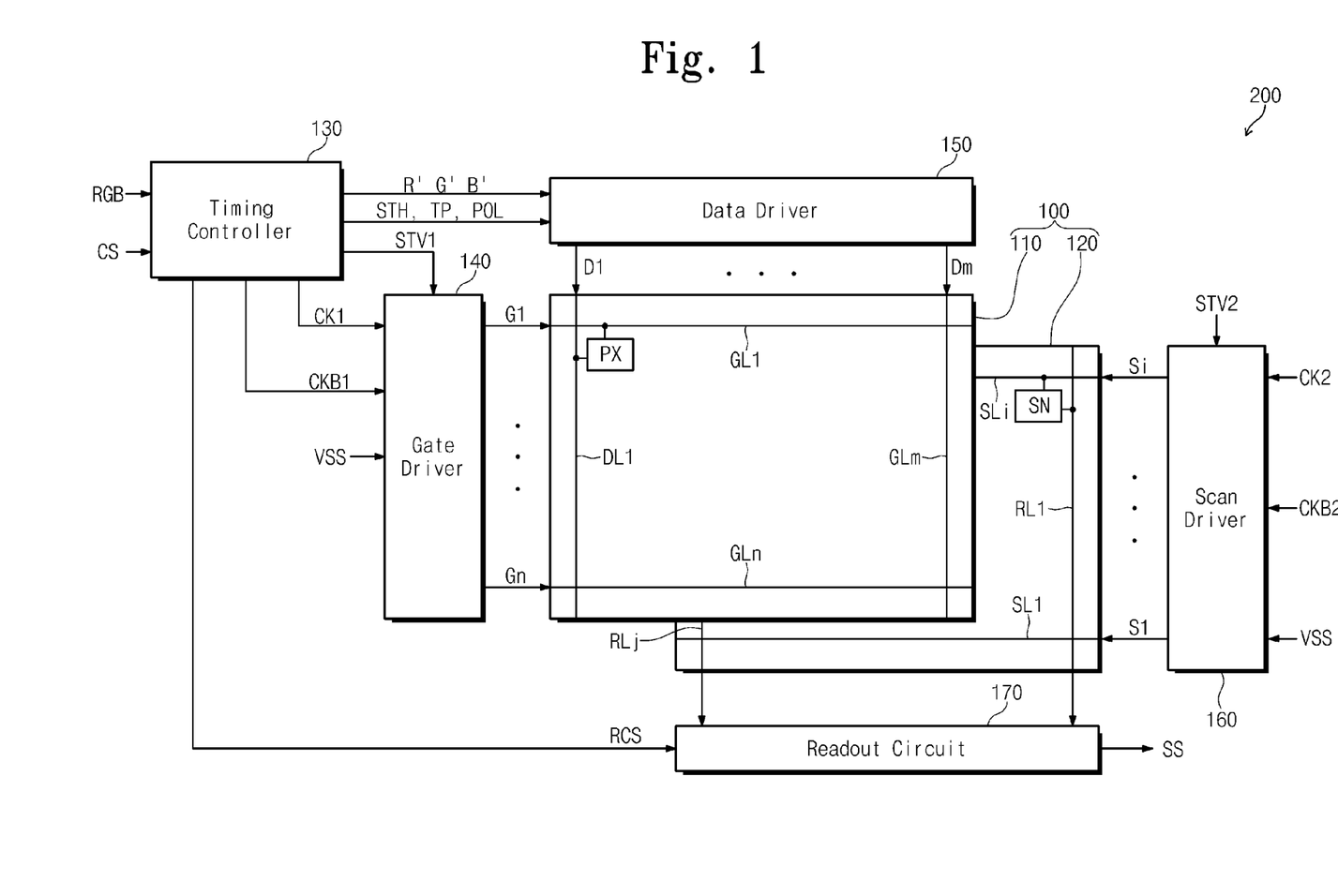
FIG. 1 is a block diagram showing a display apparatus according to exemplary embodiments of the present invention.
Figure 2:
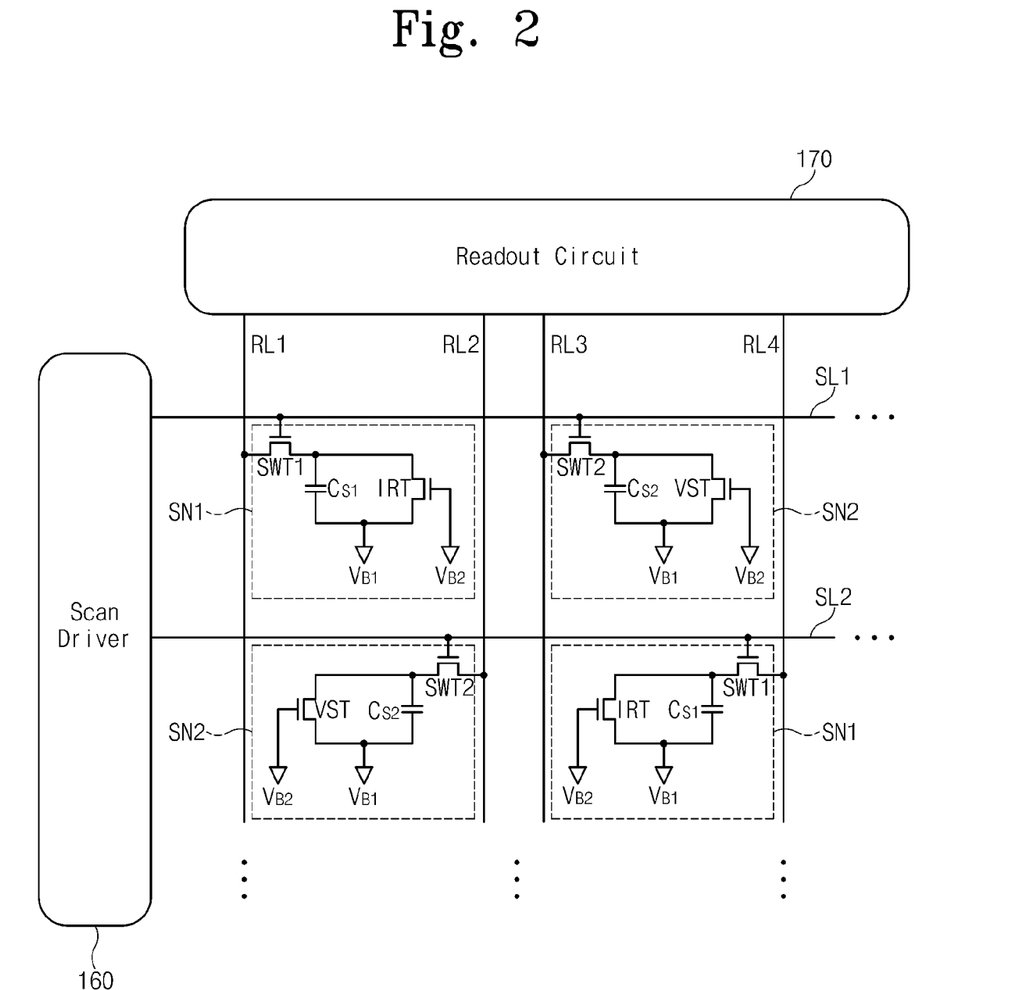
FIG. 2 is a circuit diagram showing a plurality of sensors shown in FIG. 1.

FIG. 1 is a block diagram showing a display apparatus according to exemplary embodiments of the present invention, and FIG. 2 is a circuit diagram showing a plurality of sensors shown in FIG. 1.

Referring to FIG. 1, for example, a display apparatus 200 includes a display panel 100, a timing controller 130, a gate driver 140, a data driver 150, a scan driver 160, and a readout circuit 170.

The timing controller 130 receives a plurality of image signals RGB and a plurality of control signals CS from an external source of the display apparatus 200. The timing controller 130 converts a data format of the image signals RGB into a data format appropriate to an interface between the data driver 150 and the timing controller 130 and provides the converted image signals R'G'B' to the data driver 150. In addition, the timing controller 130 applies data control signals, such as an output start signal TP, for example, a horizontal start signal STH and a polarity inversion signal POL to the data driver 150, and applies gate control signals, such as a first start signal STV1, a first clock signal CK1, and a second clock signal CKB1 to the gate driver 140.

The gate driver 140 sequentially outputs gate signals G1 to Gn in response to the gate control signals STV1, CK1, and CKB1 provided from the timing controller 130.

The data driver 150 converts the image signals R'G'B' into data voltages D1 to Dm in response to the data control signals TP, STH, and POL provided from the timing controller 130. The data voltages D1 to Dm are applied to the display panel 100.

The display panel 100 includes a first substrate 110, a second substrate 120 facing the first substrate 110, and a liquid crystal layer (not shown) disposed between the first substrate 110 and the second substrate 120. The first substrate 110 includes a plurality of pixels PX and the second substrate 120 includes a plurality of sensors SN.

It is noted that since the pixels PX have the same structure and function, one pixel will be described in detail as a representative example.

For example, the first substrate 110 may include a plurality of gate lines GL1 to GLn, a plurality of data lines DL1 to DLm crossing the gate lines GL1 to GLn, and a plurality of pixels PX. Each of the pixels PX includes a thin film transistor (not shown) and a pixel electrode (not shown). The thin film transistor includes a gate electrode connected to a corresponding gate line of the gate lines GL1 to GLn, a source electrode connected to a corresponding data line of the data lines DL1 to DLm, and a drain electrode connected to the pixel electrode.

The gate lines GL1 to GLn are connected to the gate driver 140 and the data lines DL1 to DLm are connected to the data driver 150. The gate lines GL1 to GLn receive the gate signals G1 to Gn applied from the gate driver 140 and the data lines DL1 to DLm receive the data voltages D1 to Dm applied from the data driver 150.

Accordingly, the thin film transistor in each pixel PX is turned on in response to the gate signal applied through the corresponding gate line so that the data voltage applied through the corresponding data line may be applied to the pixel electrode through the turned-on thin film transistor.

For example, the second substrate 120 further includes a reference electrode facing the pixel electrode while interposing the liquid crystal layer between the pixel electrode and the reference electrode.

In addition, for example, the second substrate 120 further includes a plurality of scan lines SL1 to SLi and a plurality of readout lines RL1 to RLj crossing the scan lines SL1 to SLi.

For the convenience of explanation, first and second scan lines SL1 and SL2 among the scan lines SL1 to SLi and first to fourth readout lines RL1, RL2, RL3, and RL4 among the readout lines RL1 to RLj have been shown in FIG. 2.

Referring to FIG. 2, the sensors SN may include at least two kinds of sensors. For example, the sensors SN may include a plurality of first sensors SN1 to detect a first light having an infrared ray wavelength range and a plurality of second sensors SN2 to detect a second light having a visible ray wavelength range.

Each of the first sensors SN1 includes a first switching transistor SWT1, a first sensor transistor IRT, and a first capacitor $C_{S1}$ according to exemplary embodiments. For example, the first switching transistor SWT1 includes a gate electrode connected to a corresponding scan line of the scan lines SL1 to SLi, a source electrode connected to a corresponding readout line of the readout lines RL1 to RLj, and a drain electrode connected to the first capacitor $C_{S1}$ and the first sensor transistor IRT.

The first capacitor $C_{S1}$ may include a first electrode connected to the drain electrode of the first switching transistor SWT1 and a second electrode applied with a first bias voltage $V_{B1}$. For example, the first bias voltage $V_{B1}$ may be about −8.75 volts.

The first sensor transistor IRT may include a gate electrode applied with a second bias voltage $V_{B2}$, a source electrode connected to the drain electrode of the first switching transistor SWT1, and a drain electrode applied with the first bias voltage $V_{B1}$. The second bias voltage $V_{B2}$ has a voltage level lower than that of the first bias voltage $V_{B1}$. For example, the second bias voltage $V_{B2}$ may be about −13.75 volts.

For example, each of the second sensors SN2 includes a second switching transistor SWT2, a second sensor transistor VST, and a second capacitor $C_{S2}$. The second switching transistor SWT2 includes a gate electrode connected to a corresponding scan line of the scan lines SL1 to SLi, a source electrode connected to a corresponding readout line of the readout lines RL1 to RLj, and a drain electrode connected to the second capacitor $C_{S2}$ and the second sensor transistor VST.

The second capacitor $C_{S2}$ may include a first electrode connected to the drain electrode of the second switching transistor SWT2 and a second electrode applied with the first bias voltage $V_{B1}$.

The second sensor transistor VST may include a gate electrode applied with the second bias voltage $V_{B2}$, a source electrode connected to the drain electrode of the second switching transistor SWT2, and a drain electrode applied with the first bias voltage $V_{B1}$. The second bias voltage $V_{B2}$ has the voltage level lower than that of the first bias voltage $V_{B1}$.

For example, the scan lines SL1 to SLi are connected to the scan driver 160 to sequentially receive scan signals S1 to Si. The scan driver 160 receives scan control signals (i.e., second start signal STV2, and third clock signal and fourth clock signal CK2 and CKB2) from the timing controller 130 and sequentially outputs the scan signals S1 to Si. The scan control signals STV2, CK2, and CKB2 may be synchronized with the gate control signals STV1, CK1, and CKB1.

For example, the readout lines RL1 to RLj are connected to the readout circuit 170 to apply voltages charged in corresponding first and second sensors SN1 and SN2 to the readout circuit 170.

As shown in FIG. 2, the first sensor SN1 and the second sensor SN2 are alternately arranged with each other in a row direction in which the scan lines SL1 to SLi are extended and alternately arranged with each other in a column direction in which the readout lines RL1 to RLj are extended.

For example, a (4k−3)th readout line (i.e., the first readout line RL1 in FIG. 2) and a 4k-th readout line (i.e., the fourth readout line RL4 in FIG. 2) among the readout lines RL1 to RLj are connected to the first sensors SN1. In this example, the "k" is a natural number equal to or larger than 1. For example, among the readout lines RL1 to RLj, a (4k−2)th readout line (i.e., the second readout line RL2 in FIG. 2) and a (4k−1)th readout line (i.e., the third readout line RL3 in FIG. 2) are connected to the second sensors SN2.

Hereinafter, the method of driving the first and second sensors SN1 and SN2 will be described in detail.

The readout circuit 170 applies a predetermined voltage, e.g., about 1 volt, to the readout lines RL1 to RLj. When a gate-on signal is applied to one of the scan lines SL1 to SLi to turn on the first and second switching transistors SWT1 and SWT2, the first switching transistor SWT1 and the second switching transistor SWT2 output the voltage of about 1 volt from the readout circuit 170 to the first capacitor $C_{S1}$ and the second capacitor and $C_{S2}$. Accordingly, the first capacitor $C_{S1}$ and the second capacitor $C_{S2}$, which are respectively connected to the first switching transistor SWT1 and second switching transistor SWT2, receive the voltage of about 1 volt through a first electrode thereof. In this example, when a source bias voltage Vs of about −4 volts is applied to a second electrode of the first capacitor $C_{S1}$ and the second capacitors $C_{S2}$, the first capacitor $C_{S1}$ and the second capacitors $C_{S2}$ are charged with a voltage of about 5 volts.

When first and second lights are not incident into the first sensor transistor VST and the second sensor transistor and IRT, respectively, the first transistor VST and the second sensor transistor IRT are turned off. Thus, the first electrode of the first capacitor $C_{S1}$ and the second capacitor $C_{S2}$ may be maintained at the voltage of about 1 volt. In a next frame, although the first switching transistor SWT1 and the second switching transistor SWT2 are turned on by the gate-on signal applied to the scan lines SL1 to SLi, no voltage difference occurs between the readout circuit 170 and the first electrode of the first capacitors $C_{S1}$ and the second capacitors $C_{S2}$. Thus, a current does not flow to the readout circuit 170 through the readout lines RL1 to RLj.

For example, when the first light and the second light are incident into the first and second sensor transistors VST and IRT, the first sensor transistor VST and the second sensor transistor IRT are turned on. Electric charges charged in the first capacitors $C_{S1}$ and the second capacitor $C_{S2}$ move through the turned-on first sensor transistor VST and the second sensor transistor IRT. As a result, an electric potential of the first electrode of the first capacitors $C_{S1}$ and the second capacitors $C_{S2}$ may be varied.

In the case that the electric potential of the first electrode of the first capacitor $C_{S1}$ and the second capacitor $C_{S2}$ is varied to about 0.5 volts and the first switching transistor SWT1 and the second switching transistor SWT2 are turned on by applying a next gate-on signal to the scan lines SL1 to SLi, the voltage difference of about 0.5 volts occurs between the readout circuit 170 and the first electrode of the first capacitor $C_{S1}$ and the second capacitor $C_{S2}$. Accordingly, the electric charges may be drain through the readout lines RL1 to RLj. The readout circuit 170 may include an integrator (not shown) that integrates the electric charges provided through the readout lines RL1 to RLj and may measure an intensity of the light incident into the first sensor SN1 and second sensor SN2 using the voltage corresponding to the amount of the electric charges integrated in the integrator.

As the intensity of the first light and the second light respectively incident into the first sensor transistor VST and the second sensor transistor IRT increases, the variation of the electric potential of the first electrode of the first capacitor $C_{S1}$ and the second capacitor $C_{S2}$ increases. Therefore, the voltage difference between the readout circuit 170 and the first electrode of the first capacitor $C_{S1}$ and the second capacitor $C_{S2}$ is increased, and thus a value of the current flowing through the readout lines RL1 to RLj is increased. Accordingly, the readout circuit 170 may measure the voltage varied depending on the intensity of the first and second lights respectively incident into the first and second sensor transistors VST and IRT.

Responsive to a readout control signal RCS from the timing controller 130, the readout circuit 170 charges the integrator with the electric charges using the current provided through the readout lines RL1 to RLj.

The readout circuit 170 sequentially applies voltages SS, which correspond to the amount of the electric charges charged in the integrator, to the timing controller 130 in response to control signals from the timing controller 130. The timing controller 130 may generate a two-dimensional coordinate value indicating a touch position on a screen or information about object scanned based on a time point at which the scan signal is generated and the voltage provided from the readout circuit 170.

Figure 3:
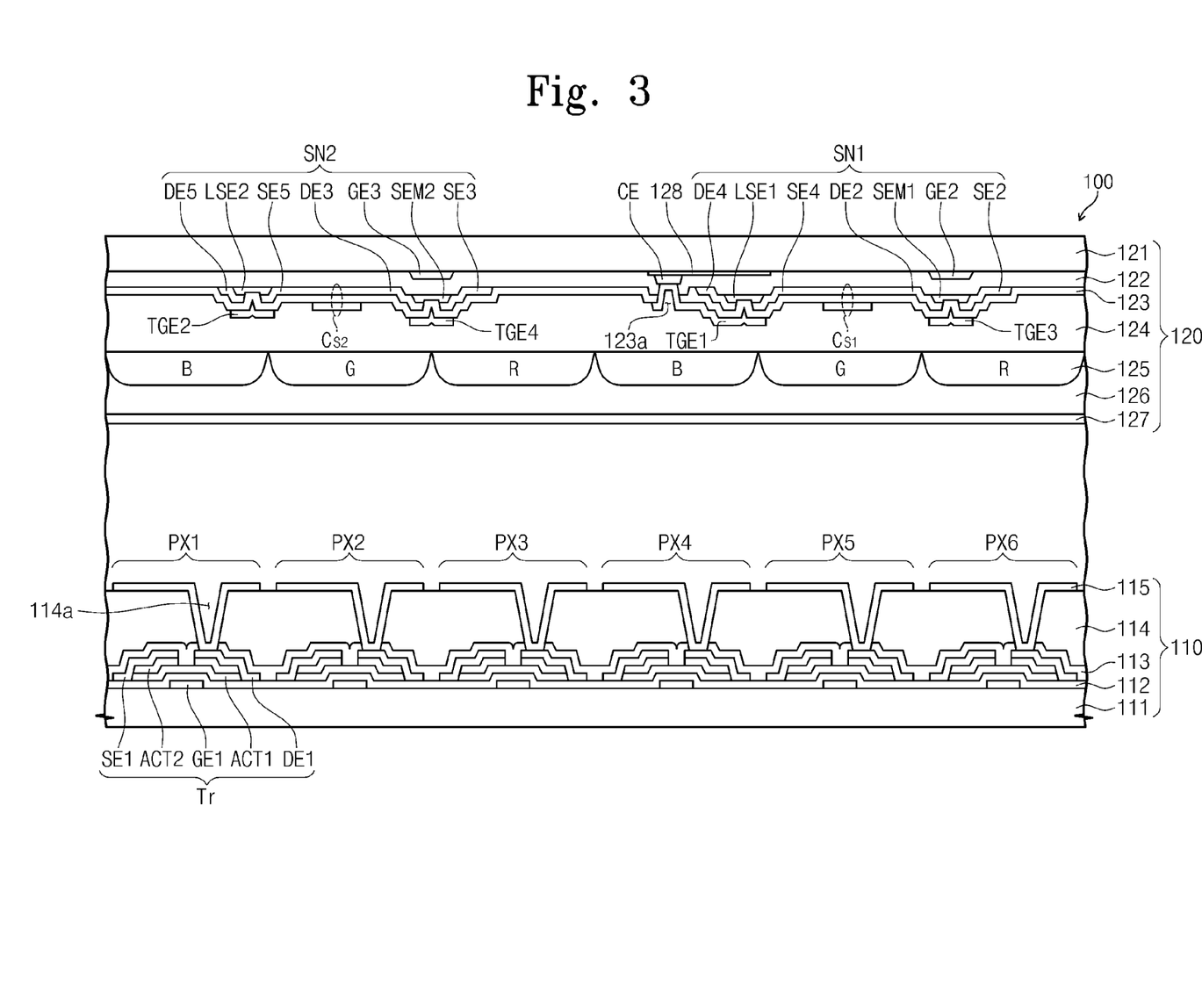
FIG. 3 is a cross-sectional view showing a display panel according to exemplary embodiments of the present invention.

FIG. 3 is a cross-sectional view showing a display panel according to exemplary embodiments of the present invention.

Referring to FIG. 3, for example, the display panel 100 includes a first substrate 110, a second substrate 120 facing the first substrate 110, and a liquid crystal layer 180 interposed between the first substrate 110 and the second substrate 120.

The first substrate 110 includes a first base substrate 111 and a plurality of pixels PX disposed on the first base substrate 111. The pixels PX are divided into a plurality of groups and each group may include three pixels PX. FIG. 3 shows six pixels PX1 to PX6 arranged in a first direction. The six pixels PX1, PX2, PX3, PX4, PX5 and PX6 have the same structure and function. Accordingly, one pixel will be described in detail as a representative example and detailed descriptions of others will be omitted to avoid unnecessarily obscuring the present invention.

For example, each pixel PX includes a thin film transistor Tr and a pixel electrode 115. In this example, a gate electrode GE1 of the thin film transistor Tr is formed on the first base substrate 111. The gate electrode GE1 is covered by a first gate insulating layer 112.

An active layer ACT1 and an ohmic contact layer ACT2 are formed on the first gate insulating layer 112 to face the gate electrode GE1. A source electrode SE1 and a drain electrode DE1 are formed above the active layer ACT1 to be spaced apart from each other. The source electrode SE1 and the drain electrode DE1 are covered by a first protection layer 113 and a first organic insulating layer 114 is further formed on the first protection layer 113.

The first protection layer 113 and the first organic insulating layer 114 are provided with a first contact hole 114a formed therethrough to expose the drain electrode DE1. The pixel electrode 115 is formed on the first organic insulating layer 114 and electrically connected to the drain electrode DE1 through the first contact hole 114a.

For example, the second substrate 120 includes a second base substrate 121, a plurality of sensors SN formed on the second base substrate 121, a color filter layer 124 including a plurality of color pixels R, G, and B respectively corresponding to the pixels PX, and a reference electrode 127.

The sensors SN may be formed on the second base substrate 121. The sensors SN may include a first sensor SN1 and a second sensor SN2. The first sensor SN1 may include a first switching transistor SWT1, a first capacitor $C_{S1}$, and a first sensor transistor IRT. The second sensor SN2 includes a second switching transistor SWT2, a second capacitor $C_{S2}$, and a second sensor transistor VST.

According to exemplary embodiments, the first sensor SN1 and second sensor SN2 may have the substantially same structure, and thus the first sensor SN1 and the second sensor SN2 may be formed through the same process.

For example, gate electrodes GE2 and GE3 of the first switching transistor SWT1 and the second switching transistor SWT2 are formed on the second base substrate 121.

The gate electrodes GE2 and GE3 of the first switching transistor SWT1 and the second switching transistor SWT2 are formed on a second gate insulating layer 122. A semiconductor layer SEM1 of the first switching transistor SWT1 and a semiconductor layer SEM2 of the second switching transistor SWT2 are formed on the second gate insulating layer 122. Each of the semiconductor layers SEM1 and SEM2 may be an amorphous silicon layer.

For example, a first light sensing layer LSE1 of the first sensor transistor IRT and a second light sensing layer LSE2 of the second sensor transistor VST are formed on the second gate insulating layer 122. The first light sensing layer LSE1 may be formed of silicon germanium (SiGe) for the first light having the infrared ray wavelength range and the second light sensing layer LSE2 may be formed of amorphous silicon (a-Si) having the visible ray wavelength range.

The second substrate 120 may further include an infrared ray filter 128 to block the second light having the visible ray wavelength range and to transmit the first light having the infrared ray wavelength range. The infrared ray filter 128 may be disposed between the second base substrate 121 and the second insulating layer 122 to correspond to the first light sensing layer LSE1. As an example, the infrared ray filter 128 may be formed of silicon germanium (SiGe).

A source electrode SE2 and a drain electrode DE2 may be formed above the semiconductor layer SEM1 of the first switching transistor SWT1, and the source electrode SE2 and the drain electrode DE2 are spaced apart from each other. For example, a source electrode SE3 and a drain electrode DE3 are formed above the semiconductor layer SEM2 of the second switching transistor SWT2 to be spaced apart from each other. As a result, the first and second switching transistors SWT1 and SWT2 may be completely formed.

For example, a source electrode SE4 and a drain electrode DE4 are formed above the first light sensing layer LSE1 of the first sensor transistor IRT such that the source electrode SE4 and the drain electrode DE4 are spaced apart from each other. In addition, a source electrode SE5 and a drain electrode DE5 are formed above the second light sensing layer LSE2 of the second sensor transistor VST to be spaced apart from each other.

According to exemplary embodiments, the source electrode SE4 of the first sensor transistor IRT may be electrically connected to the drain electrode DE2 of the first switching transistor SWT1 and may serve as the first electrode of the first capacitor $C_{S1}$.

In addition, the source electrode SE5 of the second sensor transistor VST may be electrically connected to the drain electrode DE3 of the second switching transistor SWT2 and may serve as the first electrode of the second capacitor $C_{S2}$.

The source electrode SE2 and the drain electrode DE2 of the first switching transistor SWT1, the source electrode SE3 and the drain electrode DE3 of the second switching transistor SWT2, the source electrode SE4 and the drain electrode DE4, and the source electrode SE5 and the drain electrode DE5 of the second sensor transistor VST are covered by a second protection layer 123.

A gate electrode TGE1 (hereinafter, referred to as a first top gate) of the first sensor transistor IRT and a gate electrode TGE2 (hereinafter, referred to as a second top gate) of the second sensor transistor VST are formed on the second protection layer 123.

For example, the second electrode of the first capacitor $C_{S1}$ and the second electrode of the second capacitor $C_{S2}$ are formed on the second protection layer 123.

As an example, the first switching transistor SWT1 may further include a dummy gate electrode TGE3 disposed on the second protection layer 123 and electrically connected to the gate electrode GE2. For example, the second switching transistor SWT2 may further include a dummy gate electrode TGE4 disposed on the second protection layer 123 and electrically connected to the gate electrode GE3.

As shown in FIG. 3, for example, the first top gate TGE1 of the first sensor transistor IRT may be electrically connected to the infrared ray filter 128. For example, a connection electrode CE, which is formed by the same process as the gate electrode GE2 of the first switching transistor SWT1, may be disposed on the infrared ray filter 128. The second gate insulating layer 122 and the second protection layer 123 are provided with a second contact hole 123a formed therethrough, and the first top gate TGE1 is electrically connected to the connection electrode CE through the second contact hole 123a.

The first top gate TGE1 and the second top gate TGE2 of the first sensor transistor IRT and the second sensor transistor VST and the dummy gate electrodes TGE3 and TGE4 of the first switching transistor SWT1 and the second switching transistor SWT2 may be covered by a second organic insulating layer 124. The color filter layer 125 is formed on the second organic insulating layer 124. The color filter layer 125 may include red, green, and blue color pixels R, G, and B corresponding to the pixels in one-to-one correspondence.

For example, an overcoating layer 126 is formed on the color filter layer 125 and the reference electrode 127 is formed on the overcoating layer 126.

Figure 4:
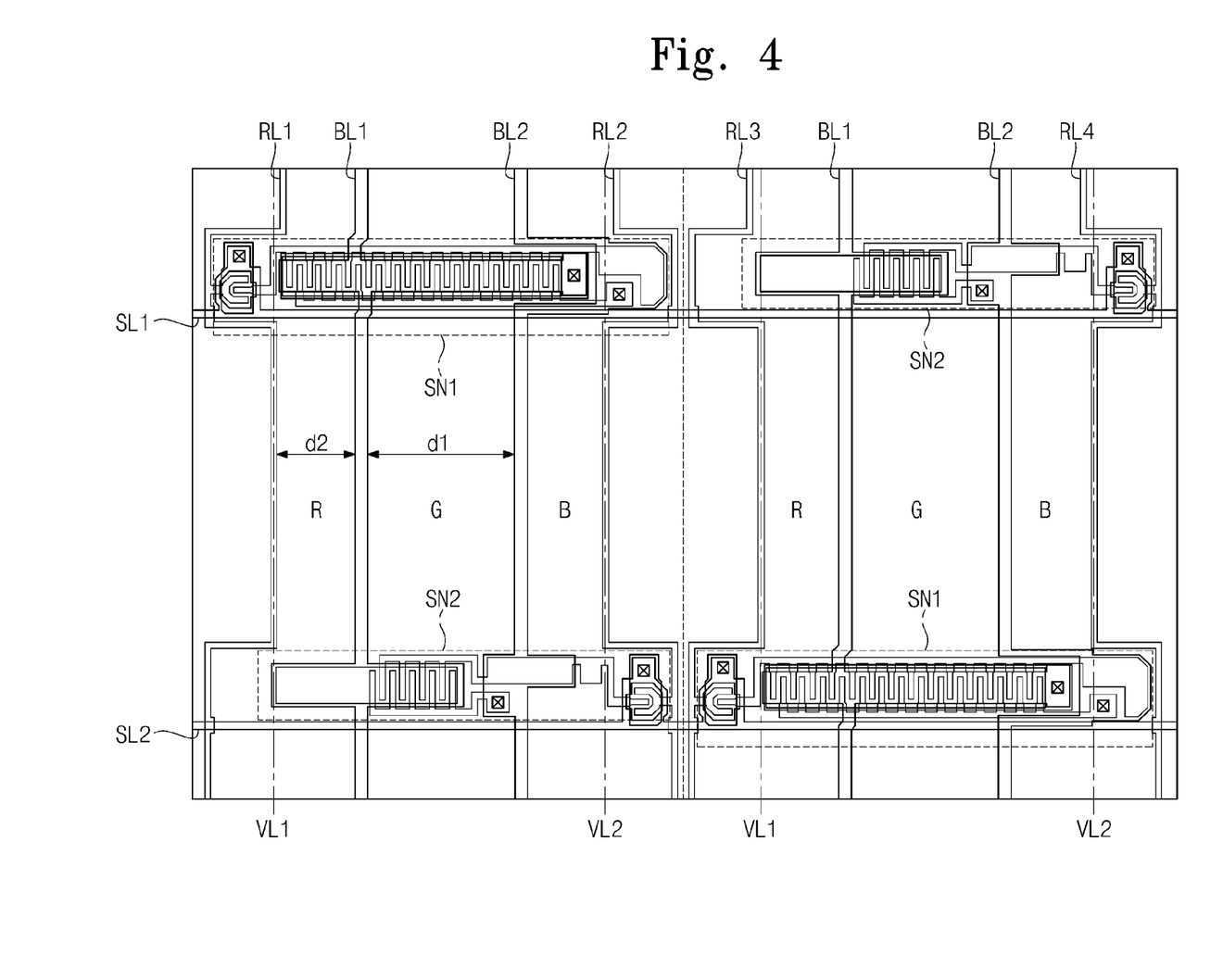
FIG. 4 is a plan view showing a layout of a second substrate according to exemplary embodiments of the present invention.
Figure 5A:
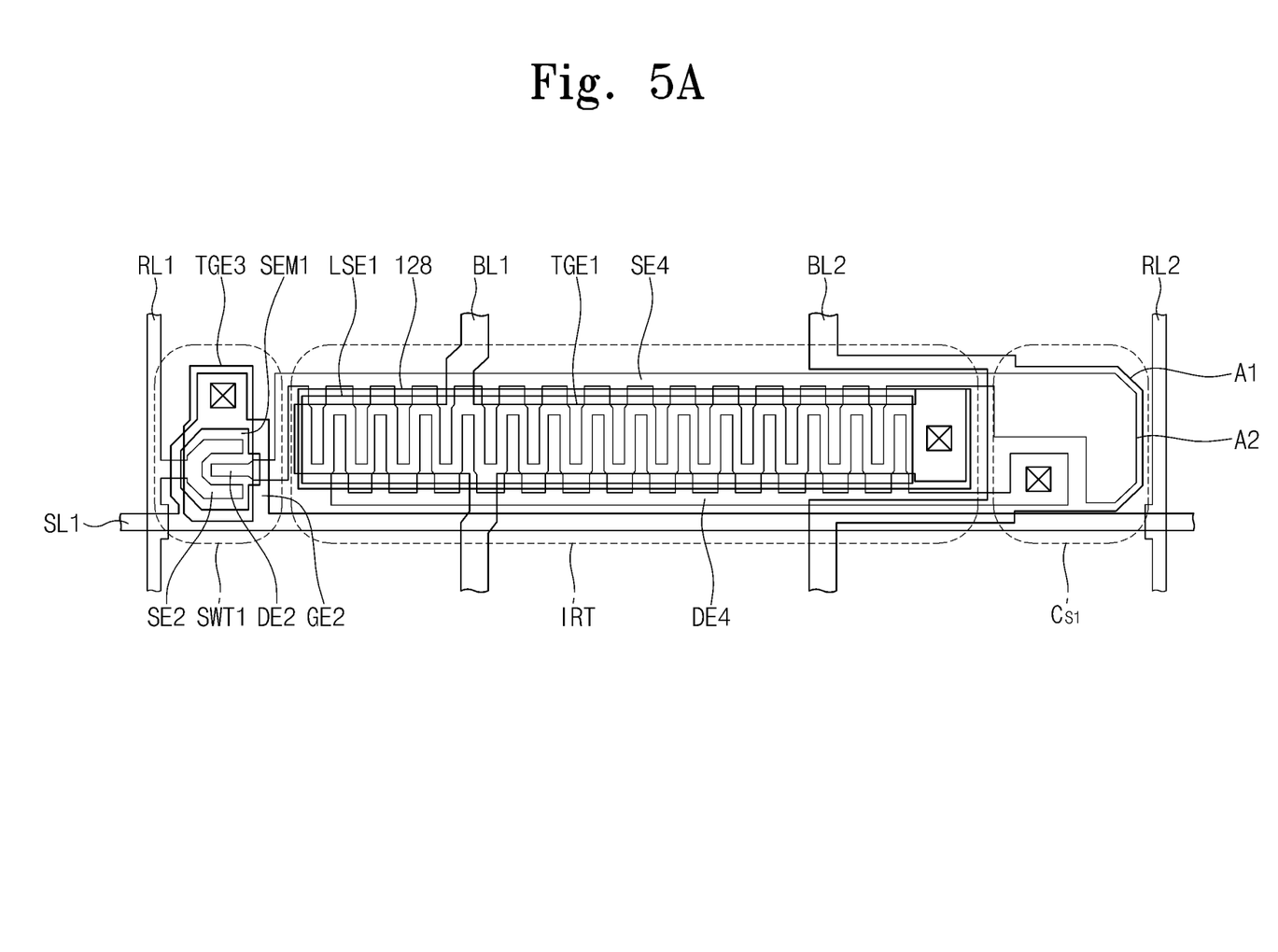
FIG. 5A is an enlarged view showing a first sensor shown in FIG. 4.
Figure 5B:
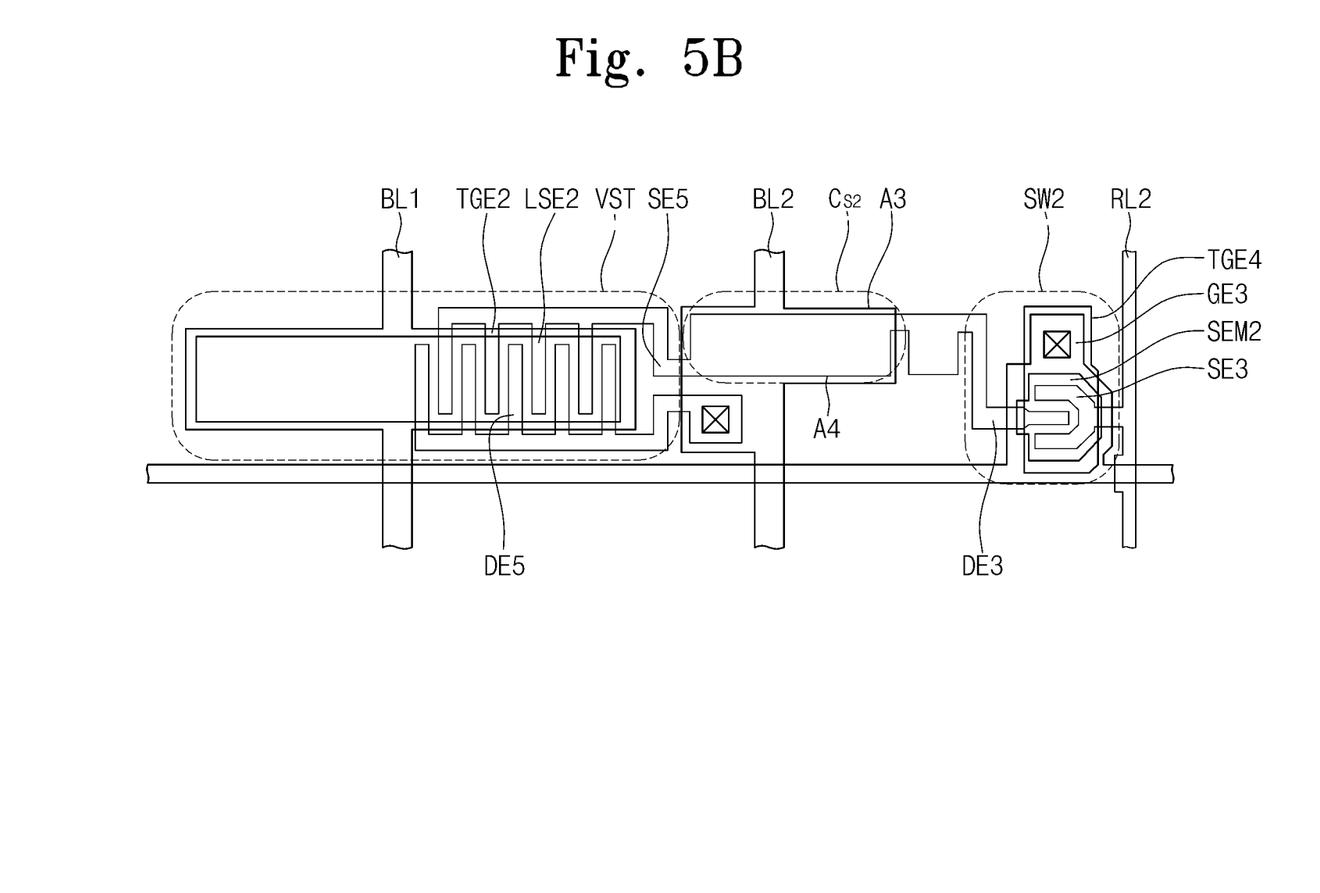
FIG. 5B is an enlarged view showing a second sensor shown in FIG. 4.

FIG. 4 is a plan view showing a layout of the second substrate according to exemplary embodiments of the present invention, FIG. 5A is an enlarged view showing the first sensor shown in FIG. 4, and FIG. 5B is an enlarged view showing the second sensor shown in FIG. 4.

Referring to FIG. 4, for example, the second substrate 120 includes the first scan line SL1 and the second scan line SL2 extended in the first direction, the first readout line RL1, the second readout line RL2, the third readout line RL3 and the fourth readout line RL4 extended in the second direction substantially perpendicular to the first direction, and first bias line BL1 and the second bias line BL2 extended in the second direction.

The first sensor SN1 and the second sensor SN2 are alternately arranged in the first direction and the second direction. As an example, the first readout line RL1 is connected to the first sensors SN1 and the second readout line RL2 is connected to the second sensors SN2. For example, the third readout line RL3 is connected to the first sensors SN1 and the fourth readout line RL4 is connected to the second sensors SN2.

For example, the first bias line BL1 receives a first bias voltage $V_{B1}$ from an exterior to apply the first bias voltage $V_{B1}$ to the first sensor SN1 and the second sensor SN2. The second bias line BL2 receives a second bias voltage $V_{B2}$ lower than the first bias voltage $V_{B1}$ to apply the second bias voltage $V_{B2}$ to the first sensor SN1 and the second sensor SN2.

When viewed in a plan view, the first bias line BL1 and the second bias line BL2 are disposed between the first readout line RL1 and the second readout line RL2 and between the third readout line RL3 and the fourth readout line RL4. The first bias line BL1 and the second bias line BL2 are spaced apart from each other by a first distance d1 between the first readout line RL1 and the second readout line RL2. For example, the first readout line RL1 and the first bias line BL1 are spaced apart from each other by a second distance d2 smaller than the first distance d1, and the second readout line RL2 and the second bias line BL2 are spaced apart from each other by the second distance d2.

The first bias line BL1 and the second bias line BL2 are spaced apart from each other by the first distance d1 between the third readout line RL3 and the fourth readout line RL4. In addition, the third readout line RL3 and the first bias line BL1 are spaced apart from each other by the second distance d2, and the fourth readout line RL4 and the second bias line BL2 are spaced apart from each other by the second distance d2. In the present exemplary embodiment, the second distance d2 may be about ½ of the first distance d1.

Meanwhile, the second substrate 120 further includes red, green, and blue color pixels R, G, and B. For example, the red, green, and blue color pixels R, G, and B are arranged in the first direction in the order listed. In this example, the first bias line BL1 is positioned at a boundary between the red color pixel R and the green color pixel G, and the second bias line BL2 is positioned at a boundary between the green color pixel G and the blue color pixel B. The first readout line RL1 and the third readout line RL3 are disposed corresponding to the red color pixel R, and the second readout line RL2 and the fourth readout line RL4 are disposed corresponding to the blue color pixel B.

Table 1 shows exemplary brightness comparison results measured for the readout lines which correspond to each of the red color pixel and the blue color pixel, and for the readout lines which do not correspond to the red pixel and the blue pixel with respect to the display panel 100 having color reproductivity of about 79.2%.

TABLE 1

|  | Red color pixel | Green color pixel | Blue color pixel | total |
|---|---|---|---|---|
| Brightness (comparison example 1) | 60.4 | 226.4 | 26.4 | 313 nit |
| Brightness contribution rate | 19.3% | 72.3% | 8.4% | 100% |
| Brightness (comparison example 2) | 57.3 | 226.4 | 25.0 | 309 nit |

As shown in Table 1, according to the comparison example 1 of which the readout lines do not correspond to the red color pixel and the blue color pixel, each of the brightness of the red color pixel, the green color pixel, and the blue color pixel is about 60.4 nit, about 226.4 nit, and about 26.4 nit, respectively.

However, the brightness contribution rate of the red color pixel and the blue color pixel are remarkably lower than the brightness contribution rate of the green color pixel. Accordingly, although an aperture ratio of the red color pixel and the blue color pixels is reduced of about 5% by the readout lines, the total brightness is minutely reduced of about 4 nit.

For example, according to the comparison example 2 of which the readout lines correspond to the red color pixel and the blue color pixel, the brightness of the green color pixel is not varied and brightness level of the red color pixel and the blue color pixels is about 57.3 nit and about 25.0 nit, respectively.

Thus, according to exemplary embodiments of the present invention, it is contemplated that the readout lines are disposed to correspond to the color pixels having relatively low brightness contribution rate, thereby minimizing the reduction of the brightness.

As shown in FIG. 4, for example, the first readout line RL1, the second readout line RL2, the third readout line RL3, the fourth readout line RL4 have a curved shape. However, at least a portion of each of the first readout line RL1 and the third readout line RL3 is extended in the second direction to be positioned corresponding to a first center line VL1 that divides the red color pixel R into two portions. In addition, at least a portion of each of the second readout line RL2 and the fourth readout line RL4 is extended in the second direction to be positioned corresponding to a second center line VL2 that divides the blue color pixel B into two portions.

Referring to FIG. 5A, for example, each of the first sensors SN1 includes the first switching transistor SWT1, the first capacitor $C_{S1}$, and the first sensor transistor IRT.

The first switching transistor SWT1 includes the gate electrode GE2 branched from the first scan line SL1, the semiconductor layer SEM1 disposed on the gate electrode GE2, the source electrode SE2 branched from the first readout line RL1, and the drain electrode DE2 spaced apart from the source electrode SE2 above the semiconductor layer SEM1. Accordingly, the first switching transistor SWT1 is turned on in response to the scan signal applied from the first scan line SL1 to output a predetermined signal to the first readout line RL1.

As an example, the first switching transistor SWT1 may further include the first dummy gate electrode TGE3 disposed on the source electrode SE2 and the drain electrode DE2 and electrically connected to the gate electrode GE2. Thus, the driving capability of the first switching transistor SWT1 may be improved by the first dummy gate electrode TGE3.

For example, the first sensor transistor IRT includes the first light sensing layer LSE1 for the first light having the infrared ray wavelength range, the source electrode SE4 extended from the drain electrode DE2 of the first switching transistor SWT1 and disposed on the first light sensing layer LSE1, the drain electrode DE4 spaced apart from the source electrode SE4 above the first light sensing layer LSE1, and the first top gate TGE1 branched from the first bias line BL1 and disposed above the source electrode SE4 and the drain electrode DE4. The first top gate TGE1 receives the first bias voltage $V_{B1}$ through the first bias line BL1. The drain electrode DE4 of the first sensor transistor IRT is electrically connected to the second bias line BL2 to receive the second bias voltage $V_{B2}$.

The first capacitor CS1 may include a first electrode A1 extended from the second bias line BL2 and a second electrode A2 extended from the source electrode SE4 of the first sensor transistor IRT to face the first electrode A1.

The first sensor SN1 may further include the infrared ray filter 128 disposed under the first light sensing layer LSE1 of the first sensor transistor IRT to filter the light provided to the first light sensing layer LSE1. The infrared ray filter 128 blocks the second light having the visible ray wavelength range and transmits the first light having the infrared ray wavelength range such that only the first light is provided to the first light sensing layer LSE1.

As an example, the infrared ray filter 128 may be formed of a semiconductor material such as silicon germanium (SiGe). In this example, the infrared ray filter 128 may be electrically connected to the first top gate TGE1. Since the infrared ray filter 128 is electrically connected to the first top gate TGE1, the infrared ray filter 128 may be used as the gate electrode of the first sensor transistor IRT, thereby improving the driving capability of the first sensor transistor IRT.

Referring to FIG. 5B, for example, each of the second sensors SN2 includes the second switching transistor SWT2, the second capacitor $C_{S2}$, and the second sensor transistor VST.

The second switching transistor SWT2 may include the gate electrode GE3 branched from the first scan line SL1, the semiconductor layer SEM2 disposed above the gate electrode GE3, the source electrode SE3 branched from the second readout line RL2, and the drain electrode DE3 spaced apart from the source electrode SE3 above the semiconductor layer SEM2. Thus, the second switching transistor SWT2 is turned on in response to the scan signal applied from the first scan line SL1 to output a predetermined signal to the second readout line RL2.

As an example, the second switching transistor SWT2 may further include the second dummy gate electrode TGE4 disposed above the source electrode SE3 and the drain electrode DE3 and electrically connected to the gate electrode GE3. Accordingly, the driving capability of the second switching transistor SWT2 may be improved by the second dummy gate electrode TGE4.

For example, the second capacitor CS2 may include a first electrode A3 branched from the second bias line BL2 to receive the second bias voltage $V_{B2}$ and a second electrode A4 branched from the drain electrode DE3 of the second switching transistor SWT2 to face the first electrode A3.

For example, the second sensor transistor VST includes the second light sensing layer LSE2 for the second light having the visible ray wavelength range, the source electrode SE5 extended from the second electrode A4 of the second capacitor $C_{S2}$ and disposed above the second light sensing layer LSE2, the drain electrode DE5 spaced apart from the source electrode SE5 above the second light sensing layer LSE2, and the second top gate TGE2 branched from the first bias line BL1 and disposed above the source electrode SE5 and the drain electrode DE5. The second top gate TGE2 receives the first bias voltage $V_{B1}$ through the first bias line BL1. The drain electrode DE5 of the second sensor transistor VST is electrically connected to the second bias line BL2 to receive the second bias voltage $V_{B2}$.

According to exemplary embodiments of the present invention, the first sensors SN1 and the second sensors SN2 disposed on the second substrate 120 have been described, but the structure of the first sensors SN1 and the second sensors SN2 should not be limited thereto or thereby.

Figure 6:
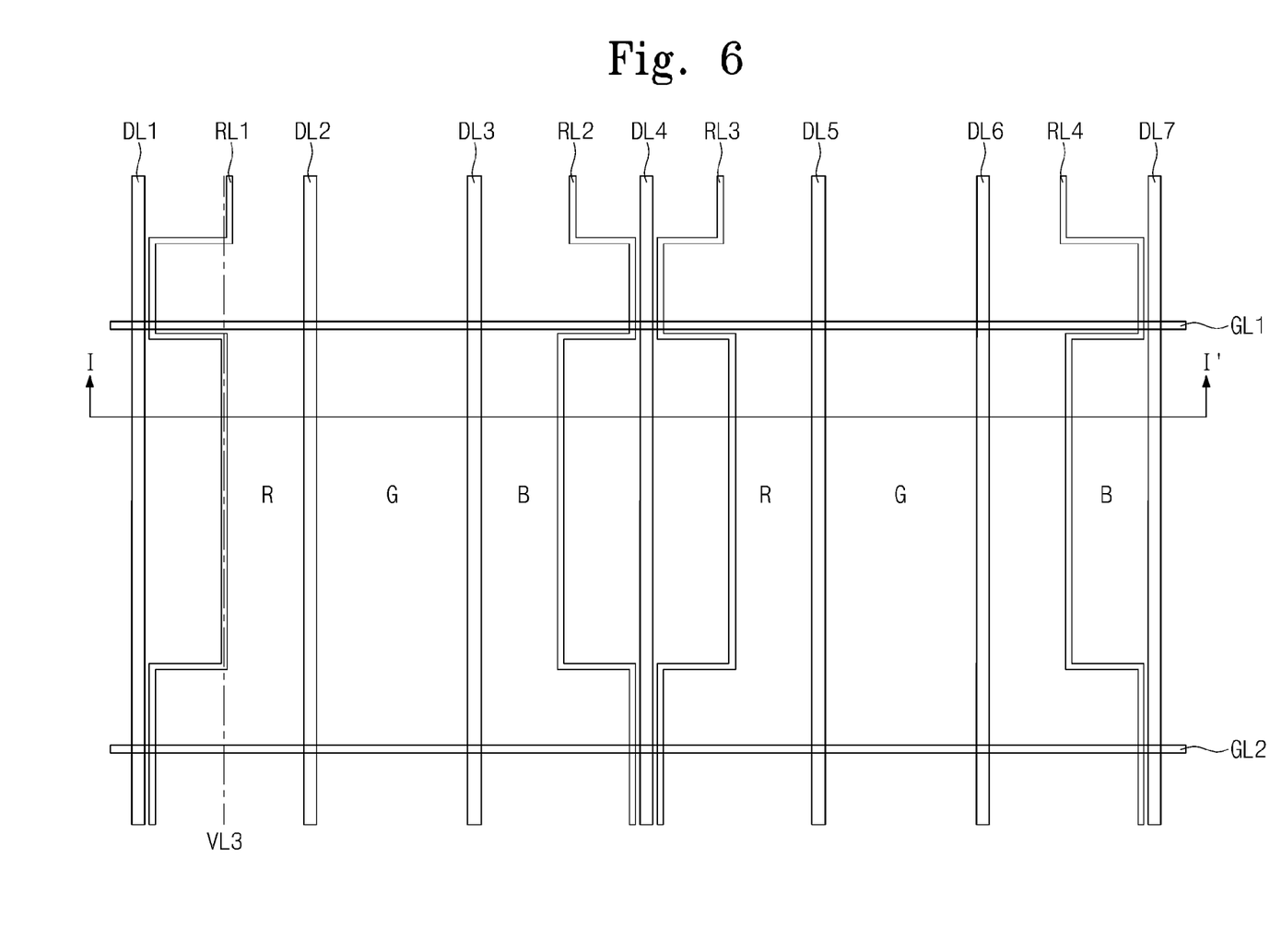
FIG. 6 is a plan view showing a position relation between readout lines and data lines.
Figure 7:
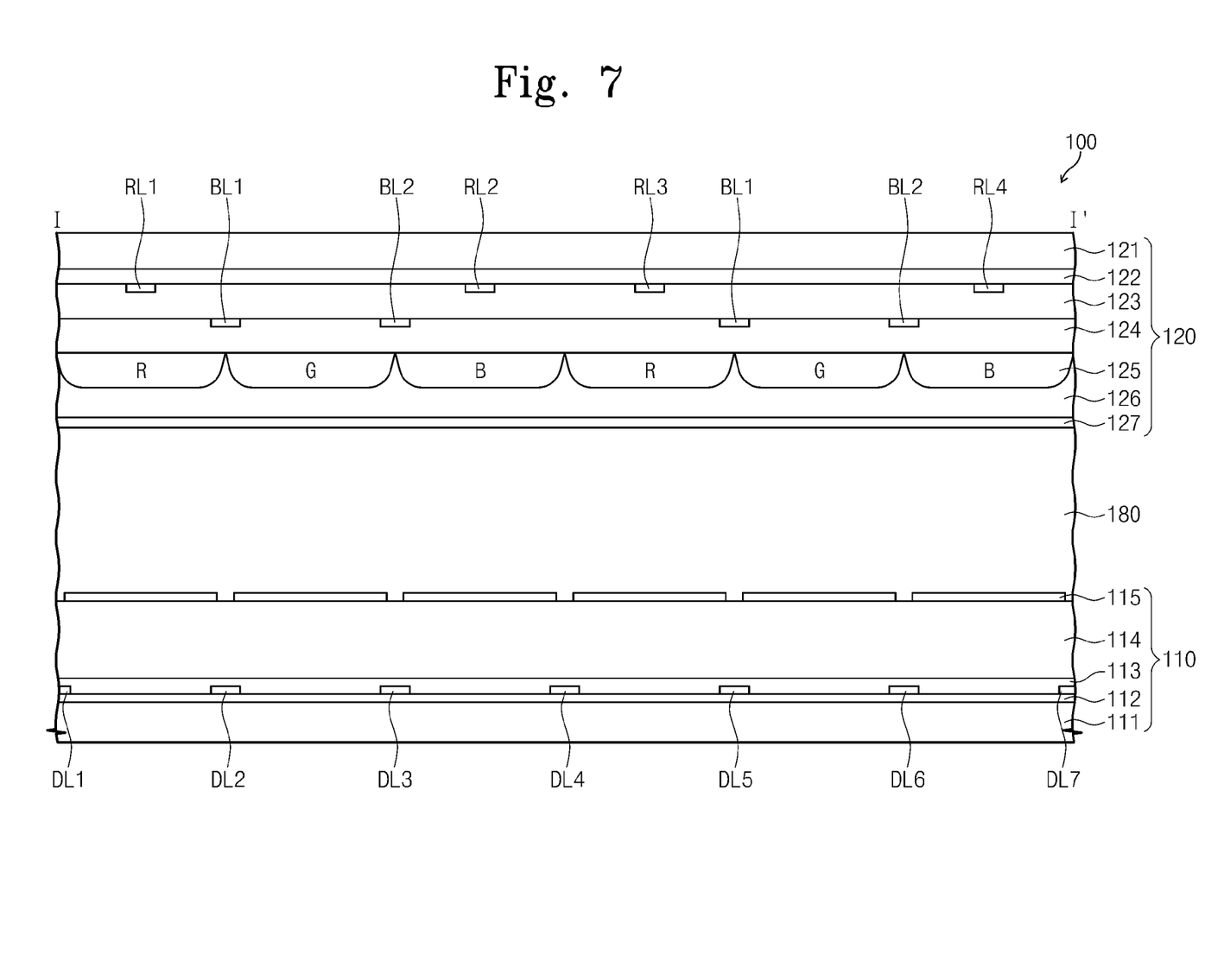
FIG. 7 is a cross-sectional view taken along a line I-I' shown in FIG. 6.

FIG. 6 is a plan view showing a position relation between readout lines and data lines, and FIG. 7 is a cross-sectional view taken along a line I-I' shown in FIG. 6.

For the convenience of illustration, in FIG. 6, the first readout line RL1, the second readout line RL2, the third readout line RL3 and the fourth readout line RL4 and red color pixel R, green color pixel G, and blue color pixel B of the second substrate 120 and the first data line DL1, the second data line DL2, the third data line DL3, the fourth data line DL4, the fifth data line DL5, the sixth data line DL5 and the seventh data line DL7 and the first gate line GL1 and the second gate line GL2 of the first substrate 110 have been shown.

In addition, in FIG. 7, the same reference numerals denote the same elements in FIG. 6, and thus detailed descriptions of the same elements will be omitted to avoid unnecessarily obscuring the present invention.

Referring to FIG. 6 and FIG. 7, the first gate line GL1 and the second gate line GL2 are extended in the first direction and arranged in the second direction, and the first data line DL1, the second data line DL2, the third data line DL3, the fourth data line DL4, the fifth data line DL5, the sixth data line DL5 and the seventh data line DL7 are extended in the second direction and arranged in the first direction.

One of the red, green, and blue color pixels R, G, and B is disposed corresponding to an area between two data lines adjacent to each other. As an example, the red color pixel R is disposed corresponding to the area between the first data line DL1 and the second data line DL2 and the area between the fourth and fifth data lines DL4 and DL5. The green color pixel G is disposed corresponding to the area between the second data line DL2 and the third data line DL3 and the area between the fifth data line DL5 and the sixth data line DL6. In addition, the blue color pixel B is disposed corresponding to the area between the third data line DL3 and the fourth data line DL4 and the area between the sixth data line DL6 and the seventh data line DL7.

For example, the first readout line RL1 and the third readout line RL3 are disposed corresponding to the red color pixel R, and the second readout lines RL2 and the fourth readout line RL4 are disposed corresponding to the blue color pixel B. That is, when two readout lines are disposed per three pixels, the two readout lines are disposed corresponding to the red color pixel R and the blue color pixel B, respectively. However, in the case that the number of the readout lines is reduced to one per three pixels, the readout line is disposed corresponding to the blue color pixel B.

In addition, the first readout line RL1 is disposed corresponding to the area between the first data line DL1 and the second data line DL2. For example, at least a portion of the first readout line RL1 may be disposed closer to a third center line VL3, which divides the area between the first data line DL1 and the second data line DL2 into two portions, than the first data line DL1 and the second data line DL2.

In a plan view, for example, when the distance between the first readout line RL1 and the first data line DL1 and the distance between the first readout line RL1 and the second data line DL2 are increased, the signal interference may be reduced. However, since the first readout line RL1 is disposed between the first data line DL1 and the second data line DL2, the signal interference may be minimized when the first readout line RL1 is positioned corresponding to the third center line VL3.

However, as shown in FIG. 6, since the first readout line RL1 has the curved shape, at least the portion of the first readout line RL1 may be disposed corresponding to the third center line VL3.

Similar to the first readout line RL1, the second readout line RL2, the third readout line RL3, and the fourth readout line RL4 may be disposed similar to the first readout line RL1.

Since the readout circuit 170 (shown in FIG. 2) detects the touch position using the variation of the sensing signal, the readout circuit 170 may not accurately generate the information indicating the touch position when the sensing signal is distorted by the signal interference.

However, each of the readout lines RL1 to RL4 is disposed corresponding to the area between the two adjacent data lines to each other, in which the signal interference is relatively small, and thus the sensing signal may be prevented from being distorted by the signal interference.

Figure 8:
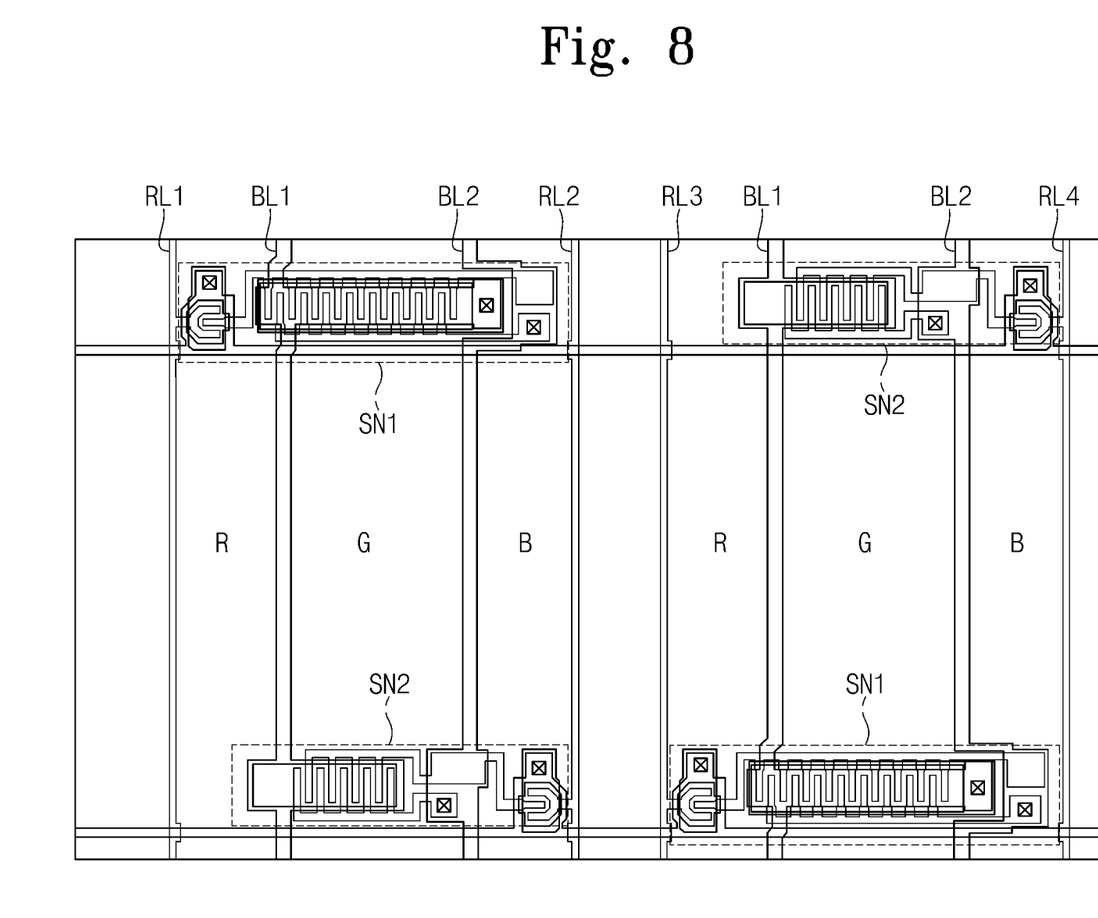
FIG. 8 is a plan view showing a layout of a second substrate according to exemplary embodiments of the present invention.

FIG. 8 is a plan view showing a layout of a second substrate according to exemplary embodiments of the present invention.

Referring to FIG. 8, for example, a second substrate 120 includes first readout line RL1, second readout line RL2, third readout line RL3 and fourth readout line RL4 extended in the second direction and having a stripe shape.

For example, the second substrate 120 further includes red, green, and blue color pixels R, G, and B. The red, green, and blue color pixels R, G, and B are sequentially arranged in the first direction.

The first readout line RL1 and the third readout line RL3 are disposed corresponding to the red color pixel R, and the second readout line RL2 and the fourth readout line RL4 are disposed corresponding to the blue color pixel B.

The first readout line RL1 and the third readout line RL3 are extended in the second direction to be disposed corresponding to a center line that divides the red color pixel R into two portions. In addition, the second readout line RL2 and the fourth readout line RL4 are extended in the second direction to be disposed corresponding to a center line that divides the blue color pixel B into two portions.

Figure 9:
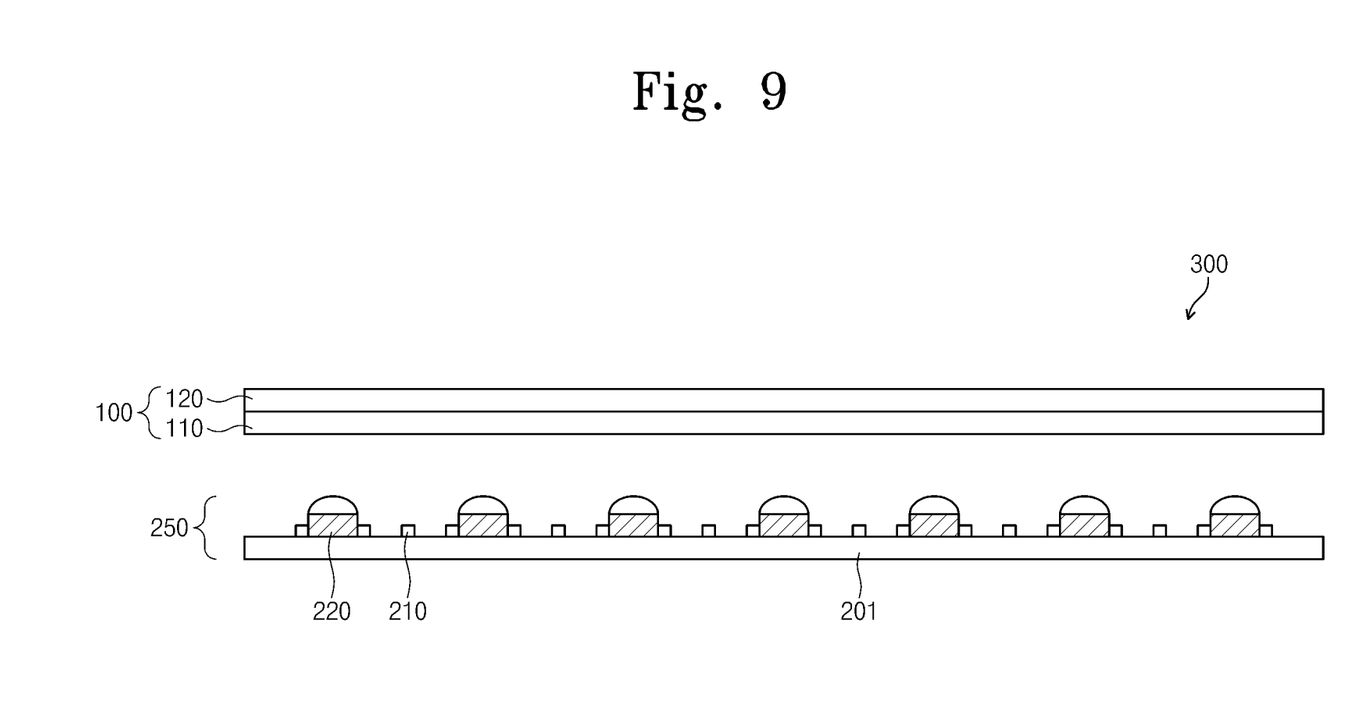
FIG. 9 is a cross-sectional view showing a display apparatus according to exemplary embodiments of the present invention.

FIG. 9 is a cross-sectional view showing a display apparatus according to exemplary embodiments of the present invention.

Referring to FIG. 9, for example, a display apparatus 300 includes the display panel 100 displaying an image and a backlight unit 250 disposed under the display panel 100.

Since the display panel 100 has been described in detail with reference to FIG. 1, FIG. 2, FIG. 3, FIG. 4, FIG. 5, FIG. 6, FIG. 8, the detailed description of the display panel 100 will be omitted to avoid unnecessarily obscuring the present invention.

For example, the backlight unit 250 includes a circuit board 201 disposed under the display panel 100, a plurality of first light sources 210 mounted on the circuit board 201 to emit the first light having the infrared ray wavelength range, and a plurality of second light sources 220 mounted on the circuit board 201 to emit a white light.

The first light sources 210 and the second light sources 220 may be alternately arranged with each other on the circuit board 201. As an example, as shown in FIG. 9, at least one of the second light sources 220 may be disposed between two first light sources 210 adjacent to each other. In addition, each of the first light source 210 and the second light source 220 may include a light emitting diode.

For example, the white light emitted from the second light sources 220 is incident into the display panel 100, and the incident white light transmits through the liquid crystal layer 180 as shown in FIG. 3. The light transmittance of the liquid crystal layer 180 is controlled by an electric field formed between the pixel electrode 115 and the reference electrode 127. That is, the display panel 100 controls the transmittance of the white light by using the liquid crystal layer 180, thereby displaying an image having desired gray scale.

For example, the first light emitted from the first light sources 210 is incident into the display panel 100 and transmits through the display panel 100. Since the first light transmitting through the display panel 100 is not perceived by a user, the first light may not have affect on the user to perceive the image displayed on the display panel 100.

The first light emitted from the first light sources 210 is partially reflected by plural layers disposed in the display panel 100, and a portion of the first light may transmit through the display panel 100. The first light transmitting through the display panel 100 is emitted to the exterior, but the first light may be reflected when the object (e.g., a finger) exists on the display panel 100. Thus, the reflected first light may be incident again into the display panel 100 and detected by the first sensor transistor IRT (shown in FIG. 3).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
    a first substrate comprising a plurality of pixels and a plurality of first signal lines connected to the pixels, and
    a second substrate comprising a plurality of sensors and a plurality of second signal lines connected to the sensors, the second signal lines extending in a first direction in which the first signal lines extend, the second substrate being spaced apart from and coupled to the first substrate,
    wherein each of the second signal lines is disposed between two of the first signal lines of the first signal lines,
    wherein each of the second signal lines is disposed at a position closer to a center line between the two adjacent first signal lines than to the two adjacent first signal lines, the two adjacent first signal lines are divided by the center line,
    wherein the first substrate or the second substrate further comprises a plurality of color pixels, the center line divides at least one color pixel of the color pixels into two portions, and the second signal line overlaps with the at least one color pixel, wherein the pixels are divided into a plurality of groups of pixels, and wherein for each group of pixels, two-thirds (⅔) of the are of the group of pixels is disposed between two adjacent second signal lines of the second signal lines disposed in association with the group of pixels.

2. The display apparatus of claim 1, wherein each of the second signal lines is positioned at a position corresponding to the center line.

3. The display apparatus of claim 1, wherein
the pixels are divided into a plurality of groups, each group comprises three pixels successively arranged in a second direction substantially perpendicular to the first direction; and
at least one second signal line of the second signal lines is disposed corresponding to each group.

4. The display apparatus of claim 3, wherein the first substrate or the second substrate further comprises a red color pixel, a green color pixel, and a blue color pixel corresponding to the respective three pixels.

5. The display apparatus of claim 4, wherein the at least one second signal line is disposed corresponding to the blue color pixel.

6. The display apparatus of claim 4, wherein two second signal lines of the second signal lines are disposed corresponding to each group, and the two second signal lines are disposed corresponding to the red color pixel and the blue color pixel.

7. The display apparatus of claim 6, wherein
the sensors comprise a plurality of first sensors to detect an infrared ray and a plurality of second sensors to detect a visible ray; and
the first sensors are alternately arranged with the second sensors in the first direction and in the second direction.

8. The display apparatus of claim 7, wherein one of the two second signal lines is connected to the first sensors and a remaining one of the two second signal lines is connected to the second sensors.

9. An apparatus comprising:
a first substrate comprising a plurality of pixels, a plurality of gate lines configured to turn on the pixels in at least one row unit, and a plurality of data lines configured to apply a data signal to the turned on pixels; and
a second substrate comprising a plurality of sensors, a plurality of scan lines configured to turn on the sensors in at least one row unit, and a plurality of readout lines configured to read out a signal from the turned on sensors, the second substrate being spaced apart from the first substrate,
wherein each of the readout lines is disposed between two adjacent data lines of the data lines,
wherein each of the readout lines is disposed at a position closer to a center line between the two adjacent data lines than to the two adjacent data lines, the two adjacent data lines being divided by the center line,
wherein the first substrate or the second substrate further comprises a plurality of color pixels, the center line divides at least one color pixel of the color pixels into two portions, and the second signal line overlaps with the at least one color pixel,
wherein the pixels are divided into a plurality of groups of pixels, and
wherein for each group of pixels, two-thirds (⅔) of the area of the group of pixels is disposed between two adjacent readout lines of the readout lines disposed in association with the group of pixels.

10. The display apparatus of claim 9, wherein each of the readout lines is positioned at a position corresponding to the center line.

11. The display apparatus of claim 9, wherein:
the pixels are divided into a plurality of groups, each group comprises three pixels successively arranged in a second direction substantially perpendicular to the first direction; and
at least one sensor of the sensors and at least one readout line of the readout lines are disposed corresponding to each group.

12. The display apparatus of claim 11, wherein the first substrate or the second substrate further comprises a red color pixel, a green color pixel, and a blue color pixel corresponding to the respective three pixels.

13. The display apparatus of claim 12, wherein the at least one readout line is disposed corresponding to the blue color pixel.

14. The display apparatus of claim 11, wherein:
two readout lines of the readout lines are disposed corresponding to each group; and
the two readout lines are disposed correspond to the red color pixel and blue color pixel.

15. The display apparatus of claim 14, wherein:
the sensors comprise a plurality of first sensors to detect an infrared ray and a plurality of second sensors to detect a visible ray, and
the first sensors are alternately arranged with the second sensors in the first direction and in the second direction.

16. The display apparatus of claim 15, wherein one of the two readout lines is connected to the first sensors and a remaining one of the two readout lines is connected to the second sensors.

17. The display apparatus of claim 9, further comprising a backlight unit disposed at a rear surface of the first substrate to emit a light.

18. The display apparatus of claim 17, wherein:
the backlight unit comprises a first light source to emit a first light having an infrared ray wavelength range and a second light source to emit a white light; and
the sensors comprise a plurality of first sensors to detect the first light.

19. The display apparatus of claim 18, wherein the sensors further comprise a plurality of second sensors to detect a second light having a visible ray wavelength range.

20. A display, comprising:
a plurality of gate lines disposed in a first direction;
a plurality of data lines disposed in a second direction crossing the first direction;
a plurality of readout lines comprising first readout lines and second readout lines disposed between the data lines the readout lines being disposed in the second direction; and
groups of pixels, each group of pixels comprising a red pixel, a green pixel, and a blue pixel, wherein, for each group of pixels, a first readout line of the first readout lines is disposed in the red pixel of the group to divide a display area of the red pixel into two portions and a second readout line of the second readout lines is disposed in the blue pixel of the group to divide a display area of the blue pixel into two portions, and
wherein for each group of pixels, two-thirds (⅔) of the area of the group of pixels is disposed between the first readout line and the second readout lines disposed in association with the group of pixels.

* * * * *